(12) United States Patent
Gao et al.

(10) Patent No.: US 11,513,855 B2
(45) Date of Patent: Nov. 29, 2022

(54) SYSTEM AND METHOD FOR ALLOCATING CENTRAL PROCESSING UNIT (CPU) CORES FOR SYSTEM OPERATIONS

(71) Applicant: EMC IP Holding Company, LLC, Hopkinton, MA (US)

(72) Inventors: Jian Gao, Beijing (CN); Vamsi K. Vankamamidi, Hopkinton, MA (US); Hongpo Gao, Beijing (CN); Jamin Kang, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 353 days.

(21) Appl. No.: 16/842,757

(22) Filed: Apr. 7, 2020

(65) Prior Publication Data
US 2021/0311793 A1   Oct. 7, 2021

(51) Int. Cl.
*G06F 9/50* (2006.01)

(52) U.S. Cl.
CPC .... *G06F 9/5027* (2013.01); *G06F 2209/5012* (2013.01)

(58) Field of Classification Search
None
See application file for complete search history.

(56) References Cited

U.S. PATENT DOCUMENTS

| | | | |
|---|---|---|---|
| 6,775,794 B1 * | 8/2004 | Horst | G06F 11/1092 714/E11.034 |
| 9,558,068 B1 * | 1/2017 | Bono | G06F 11/00 |
| 9,697,219 B1 * | 7/2017 | Wang | G06F 3/0619 |
| 9,760,574 B1 * | 9/2017 | Zhai | G06F 3/0659 |
| 10,782,894 B1 * | 9/2020 | Han | G06F 3/0689 |
| 11,061,910 B1 * | 7/2021 | Kondiles | G06F 16/2456 |
| 2007/0168706 A1 * | 7/2007 | Humlicek | G06F 11/1092 714/6.12 |
| 2009/0210618 A1 * | 8/2009 | Bates | G06F 11/1092 711/114 |
| 2009/0235260 A1 * | 9/2009 | Branover | G06F 9/5027 718/102 |
| 2014/0149993 A1 * | 5/2014 | Sandstrom | G06F 9/5027 718/108 |
| 2019/0042158 A1 * | 2/2019 | Lv | G06F 3/061 |

* cited by examiner

*Primary Examiner* — Adam Lee
(74) *Attorney, Agent, or Firm* — Brian J. Colandreo; Mark H. Whittenberger; Holland & Knight LLP

(57) ABSTRACT

A method, computer program product, and computing system for allocating a first set of cores of a plurality of cores of a multicore central processing unit (CPU) for processing host input-output (IO) operations of a plurality of operations on a storage system. A second set of cores of the plurality of cores may be allocated for processing flush operations of the plurality of operations on the storage system. A third set of cores of the plurality of cores may be allocated for processing rebuild operations of the plurality of operations on the storage system. At least one of one or more host IO operations, one or more rebuild operations, and one or more flush operations may be processed, via the plurality of cores and based upon, at least in part, the allocation of the plurality of cores for processing the plurality of operations.

15 Claims, 4 Drawing Sheets

SYSTEM AND METHOD FOR ALLOCATING CENTRAL PROCESSING UNIT (CPU) CORES FOR SYSTEM OPERATIONS

BACKGROUND

Storing and safeguarding electronic content may be beneficial in modern business and elsewhere. Accordingly, various methodologies may be employed to protect and distribute such electronic content.

Several applications and operations may share a central processing unit (CPU). For example, host IO operations, flush operations, and rebuild operations may be processed by a CPU for storing and preserving data in a storage system. As these operations are performed on the limited resources of a CPU, various performance characteristics of the storage system may be impacted.

SUMMARY OF DISCLOSURE

In one example implementation, a computer-implemented method executed on a computing device may include, but is not limited to, allocating a first set of cores of a plurality of cores of a multicore central processing unit (CPU) for processing host input-output (IO) operations of a plurality of operations on a storage system. A second set of cores of the plurality of cores may be allocated for processing flush operations of the plurality of operations on the storage system. A third set of cores of the plurality of cores may be allocated for processing rebuild operations of the plurality of operations on the storage system. At least one of one or more host IO operations, one or more rebuild operations, and one or more flush operations may be processed, via the plurality of cores and based upon, at least in part, the allocation of the plurality of cores for processing the plurality of operations.

One or more of the following example features may be included. Allocating the first set of cores of the plurality of cores for processing host IO operations of the plurality of operations on the storage system may include allocating each core of the plurality of cores for processing host IO operations of the plurality of operations on the storage system. At least one core of the first set of cores may be allocated, as a portion of the second set of cores, for processing flush operations in addition to processing host IO operations. At least one core of the first set of cores may be allocated, as a portion of the third set of cores, for processing rebuild operations in addition to processing host IO operations. Allocating the third set of cores of the plurality of cores for processing rebuild operations of the plurality of operations on the storage system may include allocating each core of the second set of cores and at least one additional core from the plurality of cores for processing rebuild operations. Allocating the third set of cores of the plurality of cores for processing rebuild operations of the plurality of operations on the storage system may include allocating only the second set of cores for processing rebuild operations in addition to processing flush operations. Allocating the third set of cores of the plurality of cores for processing rebuild operations of the plurality of operations on the storage system may include allocating only cores of the plurality of cores that are not allocated as a portion of the second set of cores for processing flush operations. Allocating the third set of cores of the plurality of cores for processing rebuild operations may include allocating cores from the plurality of cores for processing rebuild operations based upon, at least in part, a threshold rebuild rate.

In another example implementation, a computer program product resides on a computer readable medium that has a plurality of instructions stored on it. When executed by a processor, the instructions cause the processor to perform operations that may include, but are not limited to, allocating a first set of cores of a plurality of cores of a multicore central processing unit (CPU) for processing host input-output (IO) operations of a plurality of operations on a storage system. A second set of cores of the plurality of cores may be allocated for processing flush operations of the plurality of operations on the storage system. A third set of cores of the plurality of cores may be allocated for processing rebuild operations of the plurality of operations on the storage system. At least one of one or more host IO operations, one or more rebuild operations, and one or more flush operations may be processed, via the plurality of cores and based upon, at least in part, the allocation of the plurality of cores for processing the plurality of operations.

One or more of the following example features may be included. Allocating the first set of cores of the plurality of cores for processing host IO operations of the plurality of operations on the storage system may include allocating each core of the plurality of cores for processing host IO operations of the plurality of operations on the storage system. At least one core of the first set of cores may be allocated, as a portion of the second set of cores, for processing flush operations in addition to processing host IO operations. At least one core of the first set of cores may be allocated, as a portion of the third set of cores, for processing rebuild operations in addition to processing host IO operations. Allocating the third set of cores of the plurality of cores for processing rebuild operations of the plurality of operations on the storage system may include allocating each core of the second set of cores and at least one additional core from the plurality of cores for processing rebuild operations. Allocating the third set of cores of the plurality of cores for processing rebuild operations of the plurality of operations on the storage system may include allocating only the second set of cores for processing rebuild operations in addition to processing flush operations. Allocating the third set of cores of the plurality of cores for processing rebuild operations of the plurality of operations on the storage system may include allocating only cores of the plurality of cores that are not allocated as a portion of the second set of cores for processing flush operations. Allocating the third set of cores of the plurality of cores for processing rebuild operations may include allocating cores from the plurality of cores for processing rebuild operations based upon, at least in part, a threshold rebuild rate.

In another example implementation, a computing system includes at least one processor and at least one memory architecture coupled with the at least one processor, wherein the at least one processor is configured to allocate a first set of cores of a plurality of cores of a multicore central processing unit (CPU) for processing host input-output (IO) operations of a plurality of operations on a storage system. The at least one processor may be further configured to allocate a second set of cores of the plurality of cores for processing flush operations of the plurality of operations on the storage system. The at least one processor may be further configured to allocate a third set of cores of the plurality of cores for processing rebuild operations of the plurality of operations on the storage system. The at least one processor may be further configured to process, via the plurality of cores and based upon, at least in part, the allocation of the plurality of cores for processing the plurality of operations, at least one of: one or more host IO operations, one or more rebuild operations, and one or more flush operations.

One or more of the following example features may be included. Allocating the first set of cores of the plurality of cores for processing host IO operations of the plurality of operations on the storage system may include allocating each core of the plurality of cores for processing host IO operations of the plurality of operations on the storage system. At least one core of the first set of cores may be allocated, as a portion of the second set of cores, for processing flush operations in addition to processing host IO operations. At least one core of the first set of cores may be allocated, as a portion of the third set of cores, for processing rebuild operations in addition to processing host IO operations. Allocating the third set of cores of the plurality of cores for processing rebuild operations of the plurality of operations on the storage system may include allocating each core of the second set of cores and at least one additional core from the plurality of cores for processing rebuild operations. Allocating the third set of cores of the plurality of cores for processing rebuild operations of the plurality of operations on the storage system may include allocating only the second set of cores for processing rebuild operations in addition to processing flush operations. Allocating the third set of cores of the plurality of cores for processing rebuild operations of the plurality of operations on the storage system may include allocating only cores of the plurality of cores that are not allocated as a portion of the second set of cores for processing flush operations. Allocating the third set of cores of the plurality of cores for processing rebuild operations may include allocating cores from the plurality of cores for processing rebuild operations based upon, at least in part, a threshold rebuild rate.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
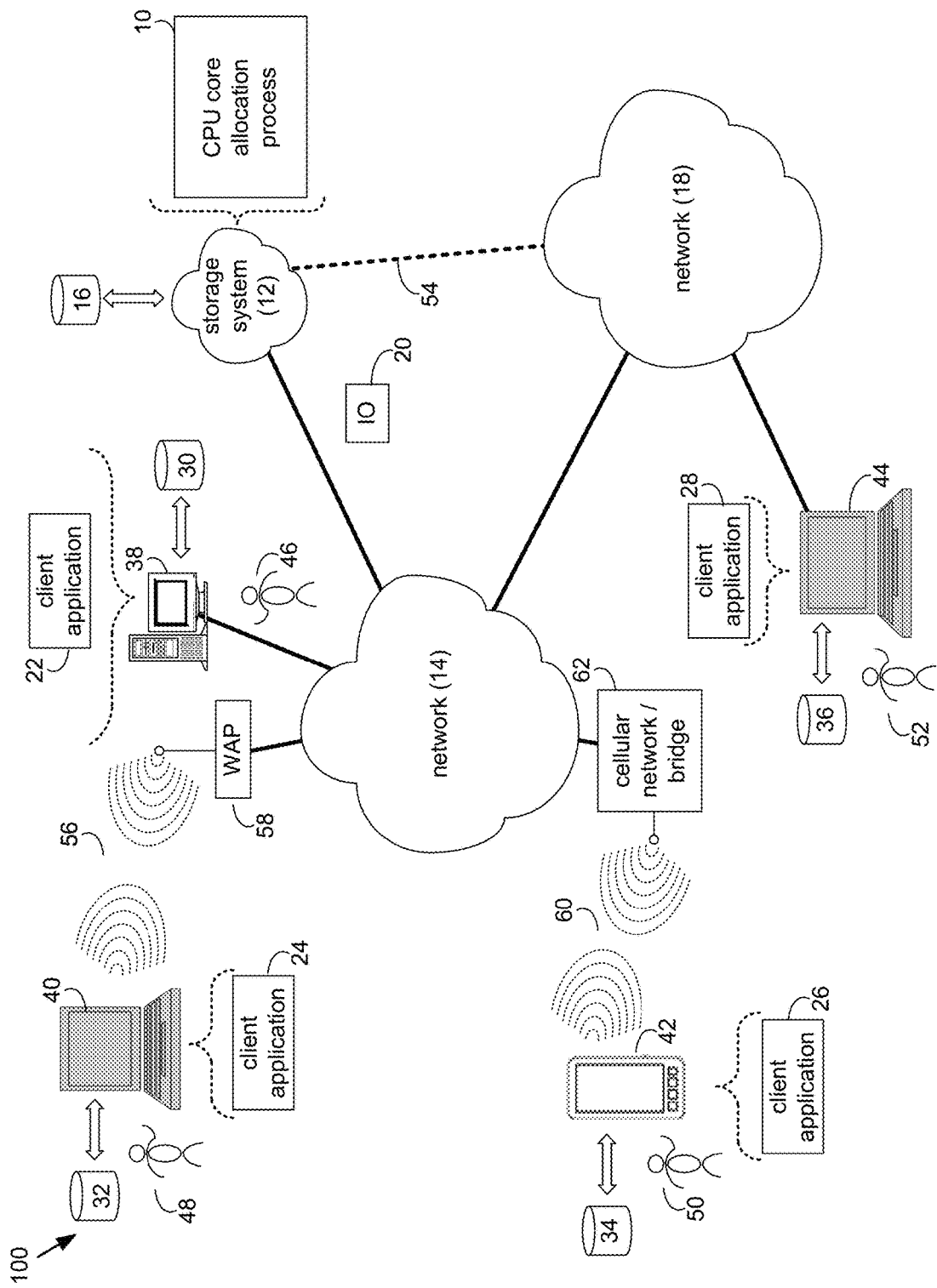
FIG. 1 is an example diagrammatic view of a storage system and a CPU core allocation process coupled to a distributed computing network according to one or more example implementations of the disclosure.

System Overview:

Referring to FIG. 1, there is shown CPU core allocation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of CPU core allocation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of CPU core allocation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a CPU core allocation process, such as CPU core allocation process 10 of FIG. 1, may include but is not limited to, allocating a first set of cores of a plurality of cores of a multicore central processing unit (CPU) for processing host input-output (IO) operations of a plurality of operations on a storage system. A second set of cores of the plurality of cores may be allocated for processing flush operations of the plurality of operations on the storage system. A third set of cores of the plurality of cores may be allocated for processing rebuild operations of the plurality of operations on the storage system. At least one of one or more host IO operations, one or more rebuild operations, and one or more flush operations may be processed, via the plurality of cores and based upon, at least in part, the allocation of the plurality of cores for processing the plurality of operations.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
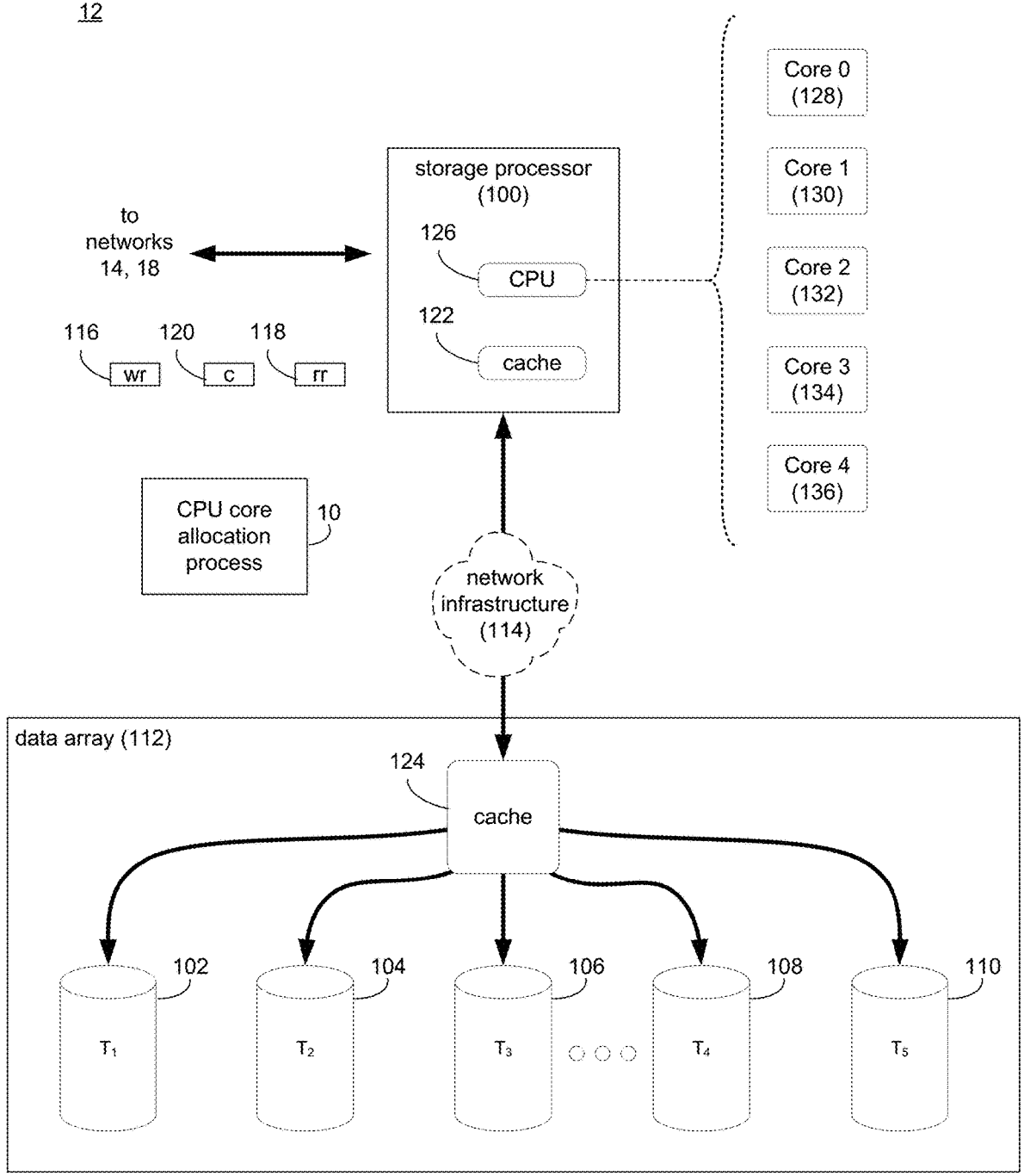
FIG. 2 is an example diagrammatic view of the storage system of FIG. 1 according to one or more example implementations of the disclosure.
Figure 3:
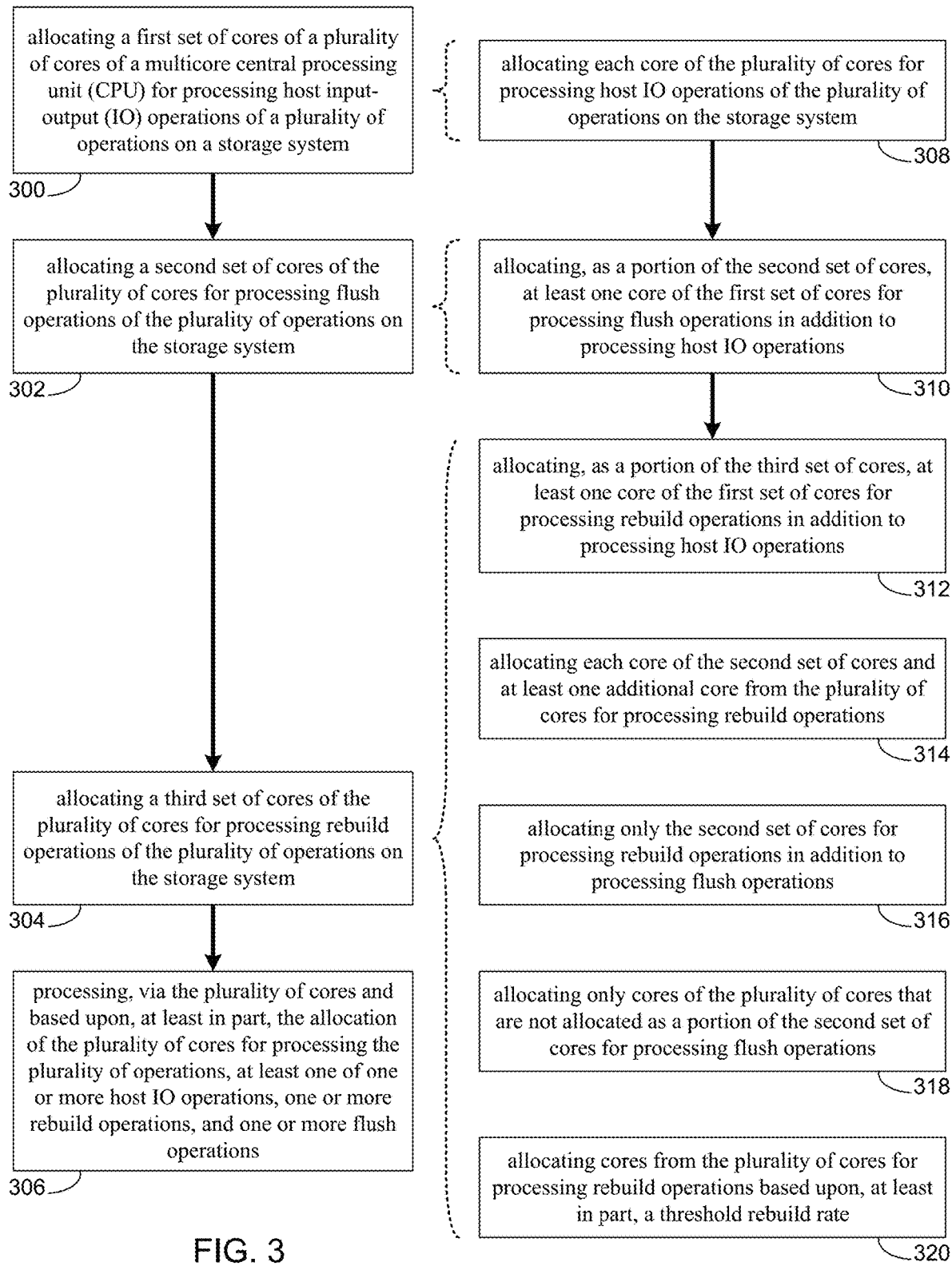
FIG. 3 is an example flowchart of CPU core allocation process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of CPU core allocation process 10. The instruction sets and subroutines of CPU core allocation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of CPU core allocation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of CPU core allocation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of CPU core allocation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage processor 100 may include one or more central processing units (CPUs) (e.g., CPU 126). In some implementations, the one or more CPUs may include a multicore CPU. As is known in the art, a multicore CPU may be configured to execute multiple threads or operations concurrently on each core. For example, multicore CPU 126 may include a plurality of cores (e.g., core 0 128, core 1 130, core 2 132, core 3 134, core 4 136). While an example of five cores has been described, it will be appreciated that a multicore CPU with any number of cores may be used within the scope of the present disclosure. As will be discussed in greater detail, each core of the multicore CPU (e.g., CPU 126) may be configured to process various operations in parallel.

The CPU Core Allocation Process:

Referring also to the examples of FIGS. 3-6 and in some implementations, CPU core allocation process 10 may allocate 300 a first set of cores of a plurality of cores of a multicore central processing unit (CPU) for processing host input-output (IO) operations of a plurality of operations on a storage system. A second set of cores of the plurality of cores may be allocated 302 for processing flush operations of the plurality of operations on the storage system. A third set of cores of the plurality of cores may be allocated 304 for processing rebuild operations of the plurality of operations on the storage system. At least one of one or more host IO operations, one or more rebuild operations, and one or more flush operations may be processed 306, via the plurality of cores and based upon, at least in part, the allocation of the plurality of cores for processing the plurality of operations.

As will be discussed in greater detail below, implementations of the present disclosure may allow for the balancing of CPU cores when processing various operations. For example, implementations of the present disclosure provide a CPU core utilization model to resolve the computing resource allocation for host IO operations (e.g., front end ingest that completes when data is written into a cache (e.g., a persistent write cache)), backend flush operations (e.g., flushing of "dirty" data from the write cache to backend drives), and rebuild operations (e.g., operations to rebuild a drive following a drive failure case). As will be discussed in greater detail below, implementations of the present disclosure may balance the allocation of these various operations (e.g., host IO, flush, and rebuild operations) to improve a rebuild rate and minimize an impact caused by rebuild operations on host IO operations. In some implementations, allocating CPU cores for various operations may provide a significant improvement in the operation of a storage system; especially for a hardware platform with a small number of CPU cores available.

Consider the example of Table 1 shown below with operations performed on a storage system (e.g., WX-H6014 (EX-1) with 19 698.638G Intel® SCMs; 2 8 GB MTC NVRAM; a CPU with five cores in HCI (i.e., hyperconverged) mode; 16 volumes arranged in RAID 5, 8+1). As shown below in Table 1, example IO threads were performed on the five cores of the exemplary storage system CPU, including host IO operations, rebuild operations, and flush operations.

TABLE 1

| IO Thread # | Rebuild rate (MB/s) | IOPS before Rebuild | IOPS during Rebuild | IOPS drop % | Latency before Rebuild (ms) | Latency during Rebuild (ms) |
|---|---|---|---|---|---|---|
| 1 | 982 | 18166 | 2850 | 84.31 | 0.889 | 5.371 |
| 2 | 957 | 24601 | 4990 | 79.71 | 1.355 | 7.793 |
| 4 | 944 | 26386 | 3475 | 86.83 | 3.21 | 15.216 |
| 8 | 991 | 26180 | 3431 | 86.90 | 5.704 | 49.471 |
| 16 | 982 | 24930 | 3629 | 85.44 | 10.293 | 82.886 |
| 32 | 999 | 24361 | 3398 | 86.05 | 18.533 | 221.205 |
| 64 | 989 | 24375 | 3878 | 84.09 | 33.128 | |
| 128 | 1006 | 24230 | 2270 | 90.63 | 67.98 | |

As shown above in the example of Table 1, note that as all CPU cores are utilized for host IO operations, rebuild operations, and flush operations, input/output operations per second (IOPS) severely drop (i.e., drop by 80% to 90%); while the rebuild rate is fairly stable. In this example, the drop in IOPS may not be acceptable per product requirements. As will be discussed in greater detail below, the host IO operations are greatly impacted because flush operations and rebuild operations each request a hold on a CPU core for a very long time. For example, rebuild operations generally hold a CPU core for e.g., 1.2 milliseconds and flush operations generally hold a CPU core for e.g., 200 milliseconds. As shown in the example of Table 1, as host IO operations are processed on the CPU cores with flush operations and rebuild operations; IOPS drop significantly.

Figure 4:
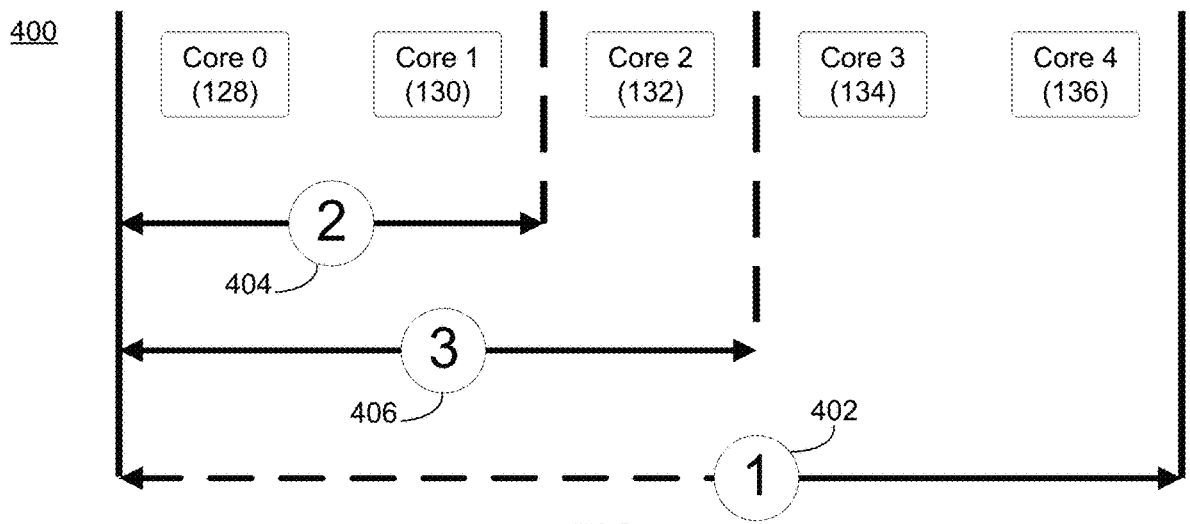
FIGS. 4-6 are example diagrammatic views of various allocations of CPU cores according to one or more example implementations of the disclosure.
Figure 5:
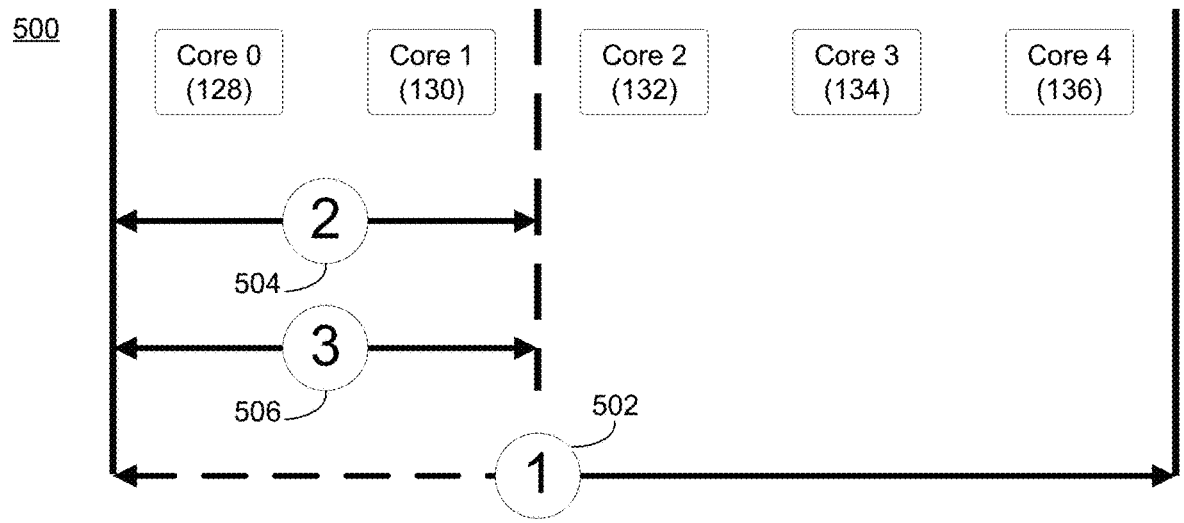
Figure 6:
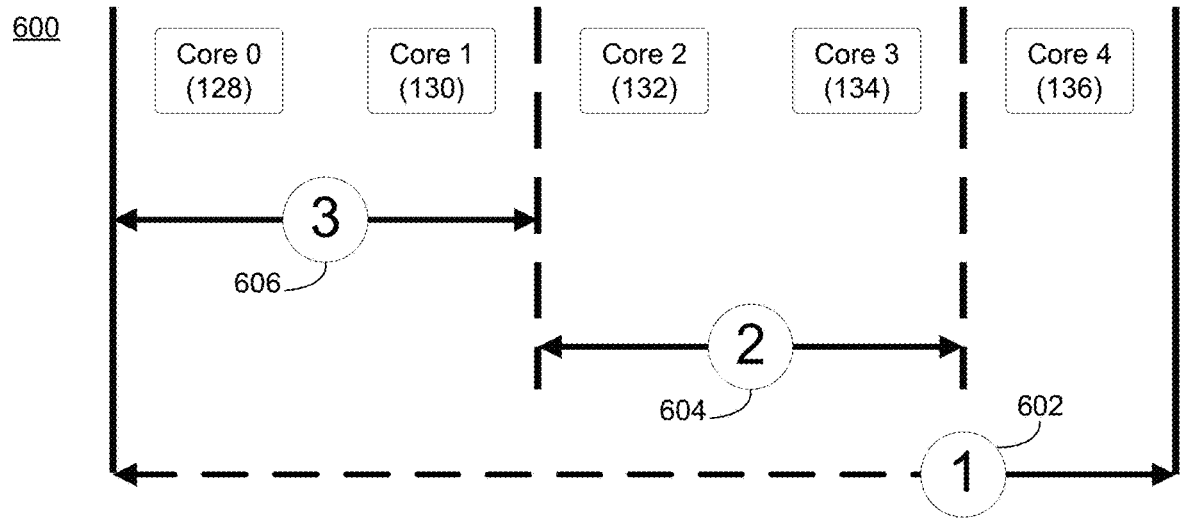

Referring also to the examples of FIGS. 4-6 and in some implementations, CPU core allocation process 10 may allocate 300 a first set of cores of a plurality of cores of a multicore central processing unit (CPU) for processing host input-output (IO) operations of a plurality of operations on a storage system. As shown in the example of FIG. 4, suppose CPU 126 includes e.g., five cores (e.g., core 0 128, core 1 130, core 2 132, core 3 134, core 4 136). In this example, CPU core allocation process 10 may allocate 300 a first set of cores (e.g., first set of cores 402) of the multicore CPU (e.g., CPU 126) for processing host IO operations on the storage system (e.g., storage system 12). Allocating may generally include a non-exclusive assigning of a core for processing a particular operation or task. In this example, CPU core allocation process 10 may allocate or assign first set of cores 402 to process host IO operations. As will be discussed in greater detail below, host IO operations may not check or supersede other non-host IO operations (e.g., flush operations, rebuild operations, etc.). Accordingly, allocating 300 a first set of cores (e.g., first set of cores 402) for processing host IO operations may be non-exclusive as other operations may be processed by the first set of cores (e.g., first set of cores 402). In some implementations, allocating 300 the first set of cores may be automatic (e.g., first set of cores 402 may be allocated 300 by CPU core allocation process 10) without any user involvement. As will be discussed in greater detail below, various allocation models or configurations may allow different levels of performance for storage system 12.

In some implementations, allocating 300 the first set of cores of the plurality of cores for processing host IO operations of the plurality of operations on the storage system may include allocating 308 each core of the plurality of cores for processing host IO operations of the plurality of operations on the storage system. As shown in the examples of FIGS. 4-6 and in some implementations, each core of the plurality of cores (e.g., core 0 128, core 1 130, core 2 132, core 3 134, core 4 136) may be allocated 308 for processing host IO operations of the plurality of operations on the storage system (e.g., storage system 12). A host IO operation may generally include an IO operation received from a host computing device (e.g., computing devices 38, 40, 42, 44) at the storage system (e.g., storage system 12). Examples of host IO operations may generally include write operations (e.g., write request 116) and read operations (e.g., read request 118). As will be discussed in greater detail below and in some implementations, allocating each core of the plurality of cores for processing host IO operations may ensure that even when a subset of the cores are processing flush operations and/or rebuild operations, host IO operations may be processed. In some implementations, the number of cores of the first set of cores (e.g., first set of cores 402) may be based upon, at least in part, a minimum threshold IOPS requirement associated with the storage system (e.g., storage system 12). In this manner, a minimum threshold IOPS requirement may be defined (e.g., user-defined via a user interface and/or automatically defined by CPU core allocation process 10) and cores may be allocated 300 in order to maintain the minimum threshold IOPS requirement. While an example of allocating 300 each of the e.g., five cores has been provided, it will be appreciated that any number of cores may be allocated as a portion of the first set of cores for processing host IO operations within the scope of the present disclosure.

In some implementations, CPU core allocation process 10 may allocate 302 a second set of cores of the plurality of cores for processing flush operations of the plurality of operations on the storage system. In some implementations, a flush operation may generally include flushing "dirty" data from a cache (e.g., cache 122) to a data array (e.g., data array 112). As is known in the art, "dirty" data generally indicates data stored in the cache (e.g., cache 122) but not yet stored in the data array (e.g., data array 112). Referring again to the example of FIG. 4 and in some implementations, CPU core allocation process 10 may allocate 302 a second set of cores (e.g., second set of cores 404) for processing flush operations on the storage system (e.g., storage system 12). As will be discussed in greater detail below and in some implementations, the second set of cores (e.g., second set of cores 402) may be a subset of the plurality of cores (i.e., second set of cores 404 allocated 302 for processing flush operations may not include each core of the plurality of cores). In this manner, flush operations may be balanced with host IO operations and rebuild operations to preserve the performance of the storage system. In some implementations, allocating 302 the second set of cores may be automatic (e.g., second set of cores 404 may be allocated 302 by CPU core allocation process 10) without any user involvement.

In some implementations, CPU core allocation process 10 may allocate 304 a third set of cores of the plurality of cores for processing rebuild operations of the plurality of operations on the storage system. In some implementations, a rebuild operation may generally include rebuilding one or more storage targets or portions of a storage target of a data array (e.g., data array 112). For example, suppose a storage target (e.g., storage target 102) of storage system 12 fails. In this example and as discussed above, storage target 102 may be configured as part of a RAID array. Accordingly, storage target 102 may be rebuilt using data from other storage targets of the RAID array. To facilitate this rebuilding of storage target 102, CPU core allocation process 10 may process 308 various rebuild operations on storage target 102 and other storage targets of data array 112 via the plurality of cores (e.g., core 0 128, core 1 130, core 2 132, core 3 134, core 4, 136).

Referring again to the example of FIG. 4 and in some implementations, CPU core allocation process 10 may allocate 304 a third set of cores (e.g., third set of cores 406) for processing rebuild operations on the storage system (e.g., storage system 12). As will be discussed in greater detail below and in some implementations, the third set of cores (e.g., third set of cores 406) may be a subset of the plurality of cores (i.e., third set of cores 406 allocated 304 for processing flush operations may not include each core of the plurality of cores). In this manner, rebuild operations may be balanced with host IO operations and flush operations to preserve the performance of the storage system. In some implementations, allocating 304 the third set of cores may be automatic (e.g., third set of cores 406 may be allocated 304 by CPU core allocation process 10) without any user involvement.

In some implementations, CPU core allocation process 10 may include one or more of allocating 310, as a portion of the second set of cores, at least one core of the first set of cores for processing flush operations in addition to processing host IO operations; and allocating 312, as a portion of the third set of cores, at least one core of the first set of cores for processing rebuild operations in addition to processing host IO operations. As discussed above and in some implementations, CPU core allocation process 10 may allocate 308 each core of the plurality of cores for processing host IO operations of the plurality of operations on the storage system. In this manner, a minimum threshold IOPS requirement may be maintained as cores are additionally allocated for processing non-host IO operations (e.g., flush operations and/or rebuild operations).

For example and in some implementations, CPU core allocation process 10 may allocate 310, as a portion of the second set of cores, at least one core of the first set of cores for processing flush operations in addition to processing host IO operations. Referring again to the example of FIG. 4 and in some implementations, a second set of cores (e.g., second set of cores 404) may be allocated 304 for processing flush operations. In this example, CPU core allocation process 10 may allocate 310, as a portion of the second set of cores (e.g., second set of cores 404) at least one core (e.g., core 0 128, core 1 130) of the first set of cores (e.g., first set of cores 402) for flush operations in addition to processing host IO operations. In this manner, core 0 128 and core 1 130 may be allocated as a portion of the first set of cores for processing host IO operations and may be allocated as a portion of the second set of cores for processing flush operations. For example, CPU core allocation process 10 may process 308 one or more host IO operations and/or one or more flush operations on core 0 128 and core 1 130. In some implementations, core 0 128 and core 1 130 may process both host IO operations and flush operations which may allow flush operations to be processed without overly degrading host IO processing performance. In some implementations, when core 0 128 and/or core 1 130 do not have any flush operations to process 308, each core may process host IO operations.

In some implementations, CPU core allocation process 10 may allocate 312, as a portion of the third set of cores, at least one core of the first set of cores for processing rebuild operations in addition to processing host IO operations. Referring again to the example of FIG. 4 and in some implementations, a third set of cores (e.g., third set of cores 406) may be allocated 306 for processing rebuild operations. In this example, CPU core allocation process 10 may allocate 312, as a portion of the third set of cores (e.g., third set of cores 406) at least one core (e.g., core 0 128, core 1 130, core 2 132) of the first set of cores (e.g., first set of cores 402) for rebuild operations in addition to processing host IO operations. In this manner, core 0 128, core 1 130, and core 2 132 may be allocated as a portion of the first set of cores for processing host IO operations and may be allocated as a portion of the third set of cores for processing rebuild operations. For example, CPU core allocation process 10 may process 308 one or more host IO operations and/or one or more rebuild operations on core 0 128, core 1 130, or core 2 132. In some implementations, core 0 128 and core 1 130 may process both host IO operations and flush operations which may allow rebuild operations to be processed without overly degrading host IO processing performance. In some implementations, when core 0 128, core 1 130, and/or core 2 132 do not have any rebuild operations to process 308, each core may process host IO operations.

In some implementations, allocating 304 the third set of cores of the plurality of cores for processing rebuild operations of the plurality of operations on the storage system may include allocating 314 each core of the second set of cores and at least one additional core from the plurality of cores for processing rebuild operations. Referring again to the example of FIG. 4 and in some implementations, CPU core allocation process 10 may allocate 314, as a portion of the third set of cores (e.g., third set of cores 406), each core (e.g., core 0 128, core 1 128) of the second set of cores (e.g., second set of cores 404) and at least one additional core (e.g., core 2 132) for processing rebuild operations. In this example, rebuild operations may not check or supersede flush operations on core 0 128 and core 1 130. As such, any flush operation in progress on core 0 128 or core 1 130 may cause CPU core allocation process 10 to process a rebuild operation on core 2 132. If no flush operations are being processed 308 on core 0 128 or core 1 130, CPU core allocation process 10 may process 308 rebuild operations on core 0 128 and/or core 1 130.

In some implementations and as discussed above, each core of the plurality of cores (e.g., core 0 128, core 1 130, core 2 132, core 3 134, core 4 136) may be allocated 308 to the first set of cores (e.g., first set of cores 402). In this example, host IO operations may not check or supersede rebuild operations on core 0 128, core 1 130, and/or core 2 132. As such, any rebuild operations in progress on core 0 128, core 1 130, and/or core 2 132 may cause CPU core allocation process 10 to process 308 a host IO operation to be performed on core 3 134 or core 4 136; as these cores are not allocated for flush operations or rebuild operations. In some implementations, a host IO operation may not check or supersede flush operations on core 0 128 or core 1 130. As such, any flush operation in progress on core 0 128 and/or core 1 130, may cause CPU core allocation process 10 to process 308 a host IO operation on core 2 132 (assuming core 2 132 is not already processing a rebuild operation), core 3 134, and/or core 4 136.

As shown below in the example of Table 2, a simulation of the exemplary allocation of cores as shown in FIG. 4 provides the following results based on the application of various virtual test bench threads:

TABLE 2

| Vdbench Thread # | Rebuild Job | IOPS before Rebuild | IOPS during Rebuild | IOPS Drop | Rebuild Rate (MB/s) |
|---|---|---|---|---|---|
| 1 | 3 | 18160.76 | 17336.61 | 4.54% | 610.84 |
|   | 4 | 19985.24 | 17604.92 | 11.91% | 755.68 |
|   | 5 | 20243.1 | 16528.1 | 18.35% | 879.53 |
|   | 6 | 19765.66 | 16411.23 | 16.97% | 971.21 |
| 2 | 3 | 24717.51 | 18733.76 | 24.21% | 593.21 |
|   | 4 | 24846.98 | 17763.54 | 28.51% | 650.00 |
|   | 5 | 24674.44 | 15656.38 | 36.55% | 620.32 |
|   | 6 | 24571.76 | 17950.8 | 26.95% | 757.00 |
| 4 | 3 | 25357.71 | 17961.82 | 29.17% | 590.68 |
|   | 4 | 24455.44 | 15901.08 | 34.98% | 600.37 |
|   | 5 | 24991.37 | 15945.63 | 36.20% | 620.79 |
|   | 6 | 25091.2 | 17244.59 | 31.27% | 645.89 |
| 8 | 3 | 24932.22 | 15603.87 | 37.41% | 575.74 |
|   | 4 | 24811.46 | 15870.49 | 36.04% | 594.16 |
|   | 5 | 25297.05 | 16479.04 | 34.86% | 603.95 |
|   | 6 | 24765.83 | 16056.18 | 35.17% | 603.32 |

As shown in Table 2, as IO load increases, the rebuild rate decreases from e.g., 1 GB/s (as shown in the row of thread "1" with 6 rebuild jobs) to e.g., 600 MB/s (as shown in the row of thread "8" with 6 rebuild jobs) while IOPS drop increases from e.g., about 17% (as shown in the row of thread "1" with 6 rebuild jobs) to e.g., 35% (as shown in the row of thread "8" with 6 rebuild jobs). From these results, the allocations of cores as shown in FIG. 4 indicate that 1) flush operations may impact the rebuild rate substantially as IO load increases; and 2) rebuild operations may also impact flush operations substantially when IO load increases, which may result in a further IOPS drop.

In some implementations, allocating 304 the third set of cores of the plurality of cores for processing rebuild operations of the plurality of operations on the storage system may include allocating 316 only the second set of cores for processing rebuild operations in addition to processing flush operations. Referring also to the example of FIG. 5 and in some implementations, CPU core allocation process 10 may allocate 300 a first set of cores (e.g., first set of cores 502) for processing host IO operations and may allocate 302 a second set of cores (e.g., second set of cores 504) for processing flush operations. In this example, CPU core allocation process 10 may allocate 300 core 0 128, core 1 130, core 2 132, core 3 134, core 4 136 for processing host IO operations and core 0 128 and core 1 130 for flush operations. In some implementations, CPU core allocation process 10 may allocate 316 only the cores (e.g., core 0 128, core 1 130) of the second set of cores (e.g., second set of cores 504) for processing rebuild operations in addition to processing flush operations. While FIG. 5 includes an example of allocating e.g., only two cores as the second set of cores and third set of cores, it will be appreciated that any number of cores may be allocated for processing flush operations and rebuild operations within the scope of the present disclosure.

As shown below in the example of Table 3, a simulation of the exemplary allocation of cores as shown in FIG. 5 provides the following results based on the application of various virtual test bench threads:

TABLE 3

| Vdbench Thread # | Rebuild Job | IOPS before Rebuild | IOPS during Rebuild | IOPS Drop | Rebuild Rate (MB/s) |
|---|---|---|---|---|---|
| 1 | 2 | 19782.34 | 17199.90 | 13.05% | 431.10 |
| 1 | 4 | 19587.08 | 13958.76 | 28.73% | 693.57 |
| 1 | 8 | 17343.26 | 11428.70 | 34.10% | 955.52 |

As shown above in Table 3, while host IO operations may receive more CPU core utilization than in the example of FIG. 4, flush operations fully overlap with rebuild operations as the same exact cores are allocated for both flush operations and rebuild operations. In this example, IOPS drop may be greater than as shown in Table 2 for the allocations shown in FIG. 4, but the rebuild rate may not change. However, the overlap between flush operations and rebuild operations may provide the dominant impact on both the rebuild rate and on IOPS. For example, host IO operations may require a flush operation to move forward and release the write cache page before the host IO operation can be performed. That is, if flush operations are slow, write cache page would be out of usage, meaning that front end host IO operations cannot be performed or served. This may be reflected in Table 3 as an IOPS drop.

In some implementations, allocating 304 the third set of cores of the plurality of cores for processing rebuild operations of the plurality of operations on the storage system may include allocating 318 only cores of the plurality of cores that are not allocated as a portion of the second set of cores for processing flush operations. Referring again to the example of FIG. 6 and in some implementations, CPU core allocation process 10 may allocate 300 a first set of cores (e.g., first set of cores 602) for processing host IO operations and may allocate 302 a second set of cores (e.g., second set of cores 604) for processing flush operations. In this example, CPU core allocation process 10 may allocate 300 core 0 128, core 1 130, core 2 132, core 3 134, core 4 136 for processing host IO operations and may allocate 302 core 2 132 and core 3 134 for flush operations. In some implementations, CPU core allocation process 10 may allocate 304 a third set of cores (e.g., third set of cores 606) for processing rebuild operations by allocating 318 only cores of the plurality of cores that are not allocated as a portion of the second set of cores (e.g., second set of cores 604) for processing flush operations. That is, CPU core allocation process 10 may allocate cores for either rebuild operations or flush operations but not both. In this manner, CPU core contention between rebuild operations and flush operations may be reduced. In the example of FIG. 6, CPU core allocation process 10 may allocate 318 core 0 128 and core 1 130 as the third set of cores (e.g., third set of cores 606) for rebuild operations.

As shown below in the example of Table 4, a simulation of the exemplary allocation of cores as shown in FIG. 6 provides the following results based on the application of various virtual test bench threads:

TABLE 4

| Vdbench Thread # | Rebuild Job | IOPS before Rebuild | IOPS during Rebuild | IOPS drop | Rebuild Rate (MB/s) |
|---|---|---|---|---|---|
| 1 | 8 | 19731.302 | 11436.92 | 42.04% | 1178.11 |
| 4 | 8 | 21856.884 | 11843.668 | 45.81% | 914.06 |
| 8 | 8 | 21387.744 | 11669.347 | 45.44% | 884 |

As shown above in Table 4 and in the example of FIG. 6, separate cores are allocated for rebuild operations and flush operations to avoid CPU contention in between these operations, which allows the host IO operations to be processed on cores not processing flush operations. For this allocation configuration, a rebuild rate may reduce from e.g., 1.18 GB/s to e.g., 900 MB/s, while the IOPS impact is maintained at around e.g., 45%. As discussed above and in some implementations, cores may be allocated 304 such that that the CPU is able to meet a minimum threshold IOPS. As shown in Table 5 below, the allocation configuration of FIG. 6 allows a balanced CPU utilization across the plurality of cores.

TABLE 5

| Thread | Rebuild trucks index | Flush trucks index | Job count | core 0 (%) | core 1 (%) | core 2 (%) | core 3 (%) | core 4 (%) |
|---|---|---|---|---|---|---|---|---|
| 1 | 0, 1 | 2, 3 | 8 | 65.62 | 72 | 72.82 | 76.46 | 45.31 |
| 4 | 0, 1 | 2, 3 | 8 | 64.56 | 70.67 | 76.05 | 76.56 | 54.54 |
| 8 | 0, 1 | 2, 3 | 8 | 76.77 | 75.21 | 73.05 | 75.62 | 64.79 |

In some implementations, allocating 304 the third set of cores of the plurality of cores for processing rebuild operations may include allocating 320 cores from the plurality of cores for processing rebuild operations based upon, at least in part, a threshold rebuild rate. For example, when a rebuild rate is defined to be greater than some threshold value (e.g., 500 MB/s), CPU core allocation process 10 may allocate 320 a certain number (e.g., two) of cores dedicated to rebuild operations. In some implementations, when a rebuild rate is defined to be less than 500 MB/s, CPU core allocation process 10 may allocate 320 a different number (e.g., one) of cores for processing rebuild operations. Referring again to the example of FIG. 6 and in some implementations, CPU core allocation process 10 may allocate 302 e.g., half of total available cores for processing flush operations and for processing host IO operations.

In some implementations, CPU core allocation process 10 may process 306, via the plurality of cores and based upon, at least in part, the allocation of the plurality of cores for processing the plurality of operations, at least one of one or more host IO operations, one or more rebuild operations, and one or more flush operations. As discussed above, by allocating the plurality of cores into various sets of cores for processing host IO operations, flush operations, and/or rebuild operations, the plurality of cores may more efficiently process 306 a plurality of operations via the plurality of cores by ensuring a minimum threshold IOPS performance and a threshold rebuild rate. As shown in the examples of FIGS. 4-6, various allocation configurations may provide different performance benefits for the storage system. In this manner, the storage system's ability to process host IO operations, flush operations, and/or rebuild operations with a limited number of CPU cores, may be improved. In some implementations, the allocation configuration of a plurality of cores may be determined automatically by CPU core allocation process 10 and/or manually by user selection (e.g., via a user interface).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the users compute r, partly on the users computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    allocating, using the computing device, a first set of cores of a plurality of cores of a multicore central processing unit (CPU) for executing one or more host input-output (IO) operations of a plurality of operations on a storage system, wherein a number of cores of the first set of cores is based upon, at least in part, a minimum threshold IO operations per second (IOPS) of the storage system;
    allocating, using the computing device, a second set of cores of the plurality of cores for executing one or more flush operations of the plurality of operations on the storage system;
    allocating, using the computing device, a third set of cores of the plurality of cores for executing one or more rebuild operations of the plurality of operations on the storage system;
    executing the plurality of operations using the plurality of cores and based upon, at least in part, the allocation of the first, the second, and the third set of cores of the plurality of cores, wherein the plurality of operations comprises: the one or more host IO operations, the one or more rebuild operations, and the one or more flush operations; and
    balancing, using the computing device, allocation of the plurality of operations across the plurality of cores to improve a rebuild rate of the storage system compared to a threshold rebuild rate and to minimize an impact on the one or more host IO operations caused by the one or more rebuild operations,
    wherein allocation of the one or more flush operations is balanced with allocation of the one or more host IO operations and the one or more rebuild operations by allocating the second set of cores of the plurality of cores for executing the one or more flush operations on the storage system such that the second set of cores is a subset of the first set of cores, and
    wherein allocation of the one or more rebuild operations is balanced with allocation of the one or more host IO operations and the one or more flush operations by allocating the third set of cores of the plurality of cores for executing the one or more rebuild operations on the storage system such that the third set of cores is a subset of the first set of cores.

2. The computer-implemented method of claim 1, wherein allocating the third set of cores of the plurality of cores for executing the one or more rebuild operations of the plurality of operations on the storage system includes allocating each core of the second set of cores and at least one additional core from the first set of cores of the plurality of cores for executing the one or more rebuild operations.

3. The computer-implemented method of claim 1, wherein allocating the third set of cores of the plurality of cores for executing the one or more rebuild operations of the plurality of operations on the storage system includes allocating only the second set of cores for executing the one or more rebuild operations in addition to executing the one or more flush operations.

4. The computer-implemented method of claim 1, wherein allocating the third set of cores of the plurality of cores for executing the one or more rebuild operations of the plurality of operations on the storage system includes allocating only cores of the first set of cores of the plurality of cores that are not allocated as a portion of the second set of cores for executing the one or more flush operations.

5. The computer-implemented method of claim 1, wherein allocating the third set of cores of the plurality of cores for executing the one or more rebuild operations includes allocating cores from the first set of cores of the plurality of cores for executing the one or more rebuild operations based upon, at least in part, the threshold rebuild rate.

6. A computer program product residing on a non-transitory computer readable medium having a plurality of instructions stored thereon which, when executed by a processor, cause the processor to perform operations comprising:
  allocating a first set of cores of a plurality of cores of a multicore central processing unit (CPU) for executing one or more host input-output (IO) operations of a plurality of operations on a storage system, wherein a number of cores of the first set of cores is based upon, at least in part, a minimum threshold IO operations per second (IOPS) of the storage system;
  allocating a second set of cores of the plurality of cores for executing one or more flush operations of the plurality of operations on the storage system;
  allocating a third set of cores of the plurality of cores for executing one or more rebuild operations of the plurality of operations on the storage system;
  executing the plurality of operations using the plurality of cores and based upon, at least in part, the allocation of the first, the second, and the third set of cores of the plurality of cores, wherein the plurality of operations comprises: the one or more host IO operations, the one or more rebuild operations, and the one or more flush operations; and
  balancing allocation of the plurality of operations across the plurality of cores to improve a rebuild rate of the storage system compared to a threshold rebuild rate and to minimize an impact on the one or more host IO operations caused by the one or more rebuild operations,
  wherein allocation of the one or more flush operations is balanced with allocation of the one or more host IO operations and the one or more rebuild operations by allocating the second set of cores of the plurality of cores for executing the one or more flush operations on the storage system such that the second set of cores is a subset of the first set of cores, and
  wherein allocation of the one or more rebuild operations is balanced with allocation of the one or more host IO operations and the one or more flush operations by allocating the third set of cores of the plurality of cores for executing the one or more rebuild operations on the storage system such that the third set of cores is a subset of the first set of cores.

7. The computer program product of claim 6, wherein allocating the third set of cores of the plurality of cores for executing the one or more rebuild operations of the plurality of operations on the storage system includes allocating each core of the second set of cores and at least one additional core from the first set of cores of the plurality of cores for executing the one or more rebuild operations.

8. The computer program product of claim 6, wherein allocating the third set of cores of the plurality of cores for executing the one or more rebuild operations of the plurality of operations on the storage system includes allocating only the second set of cores for executing the one or more rebuild operations in addition to executing the one or more flush operations.

9. The computer program product of claim 6, wherein allocating the third set of cores of the plurality of cores for executing the one or more rebuild operations of the plurality of operations on the storage system includes allocating only cores of the first set of cores of the plurality of cores that are not allocated as a portion of the second set of cores for executing the one or more flush operations.

10. The computer program product of claim 6, wherein allocating the third set of cores of the plurality of cores for executing the one or more rebuild operations includes allocating cores from the first set of cores of the plurality of cores for executing the one or more rebuild operations based upon, at least in part, the threshold rebuild rate.

11. A computing system comprising:
  at least one memory architecture; and
  at least one processor configured to allocate a first set of cores of a plurality of cores of a multicore central processing unit (CPU) for executing one or more host input-output (IO) operations of a plurality of operations on a storage system, wherein a number of cores of the first set of cores is based upon, at least in part, a minimum threshold IO operations per second (IOPS) of the storage system,
  wherein the processor is further configured to allocate a second set of cores of the plurality of cores for executing one or more flush operations of the plurality of operations on the storage system,
  wherein the processor is further configured to allocate a third set of cores of the plurality of cores for executing one or more rebuild operations of the plurality of operations on the storage system,
  wherein the processor is further configured to execute the plurality of operations using the plurality of cores and based upon, at least in part, the allocation of the first, the second, and the third set of cores of the plurality of cores, wherein the plurality of operations comprises: the one or more host IO operations, the one or more rebuild operations, and the one or more flush operations,
  wherein the processor is further configured to balance allocation of the plurality of operations across the plurality of cores to improve a rebuild rate of the storage system compared to a threshold rebuild rate and to minimize an impact on the one or more host IO operations caused by the one or more rebuild operations,
  wherein allocation of the one or more flush operations is balanced with allocation of the one or more host IO operations and the one or more rebuild operations by allocating the second set of cores of the plurality of cores for executing the one or more flush operations on the storage system such that the second set of cores is a subset of the first set of cores, and
  wherein allocation of the one or more rebuild operations is balanced with allocation of the one or more host IO operations and the one or more flush operations by allocating the third set of cores of the plurality of cores for executing the one or more rebuild operations on the storage system such that the third set of cores is a subset of the first set of cores.

12. The computing system of claim 11, wherein allocating the third set of cores of the plurality of cores for executing the one or more rebuild operations of the plurality of operations on the storage system includes allocating each core of the second set of cores and at least one additional core from the first set of cores of the plurality of cores for executing the one or more rebuild operations.

13. The computing system of claim 11, wherein allocating the third set of cores of the plurality of cores for executing the one or more rebuild operations of the plurality of operations on the storage system includes allocating only the second set of cores for executing the one or more rebuild operations in addition to executing the one or more flush operations.

14. The computing system of claim 11, wherein allocating the third set of cores of the plurality of cores for executing the one or more rebuild operations of the plurality of operations on the storage system includes allocating only cores of the first set of cores of the plurality of cores that are not allocated as a portion of the second set of cores for executing the one or more flush operations.

15. The computing system of claim 11, wherein allocating the third set of cores of the plurality of cores for executing the one or more rebuild operations includes allocating cores from the first set of cores of the plurality of cores for executing the one or more rebuild operations based upon, at least in part, the threshold rebuild rate.

\* \* \* \* \*